United States Patent Office 3,658,718
Patented Apr. 25, 1972

3,658,718
CATIONIC EMULSIFIER SYSTEM
Jon Michael Clumpner, 232 Elmhurst Ave.,
Delavan, Wis. 53115
No Drawing. Filed Apr. 23, 1970, Ser. No. 31,385
Int. Cl. B01f 17/16, 17/18, 17/22
U.S. Cl. 252—357                           5 Claims

ABSTRACT OF THE DISCLOSURE

An emulsifier system suitable for forming a stable oil and water emulsion which contains mixtures of difatty ethoxylated quaternized amidoamines in which the fatty acid residues are derived from soya and coconut oil.

---

This invention relates generally to cationic emulsifier systems, and more particularly, it relates to a quaternized difatty ethoxylated amidoamine cationic emulsifier system including particular blends of fatty acid residues, and to a method of utilizing such emulsifier systems in stabilizing an aqueous emulsion of a hydrophobic material and exhausting the hydrophobic material onto various surfaces, for example, metal, fabric, glass and paper.

Aqueous emulsions of hydrophobic materials, for example, an oil in water emulsion, are widely used in various industries in order to distribute, i.e., to exhaust, the oil phase onto a suitable substrate in a substantially continuous film. Examples of water in oil emulsions include mop and mat treatment oils, rinse aids for automatic car washing, leather topping oils, defoamers, anticaking agents, and solvent emulsion cleaners. In order to provide an oil in water emulsion which is stable, and which may be diluted with water to low oil levels without gelling or separation of the emulsion, an emulsifier must be present in the system. In the absence of a suitable emulsifier, the emulsion breaks, i.e., separates, or becomes gelled or otherwise unsuitable for use. There are various known emulsifiers which are capable of providing stable oil in water emulsions, including cationic emulsifiers such as dimethyl dicoco quaternary ammonium chlorides, imidazolines, such as 1-hydroxy ethyl-2-hepta decenyl imidazoline, ethoxylated amines; nonionic emulsifiers such as block polymers and copolymers, and Spans and Tweens, and anionic emulsifiers such as soaps, sodium alkyl sulfates, and alkyl benzene sulfonates.

It is possible to provide stable oil in water emulsions using cationic, nonionic or anionic emulsifiers, or various blends of the different type emulsifiers. However, when it is desired to provide a stable oil in water emulsion which has good exhaustion characteristics, that is, is capable of providing a uniform hydrophobic film on the surface of the article being treated, it is essential that the emulsifier system utilized in stabilizing the water in oil emulsion contain a cationic emulsifier.

A cationic emulsifier is advantageous in a system where it is desired to exhaust the oil hydrophobe onto a surface for the reasons that cationic emulsifiers are capable of utilization at substantially all pH ranges, resist biological degradation to a greater extent than do nonionic and anionic emulsifiers, reduce static electricity buildup and impart anticorrosive protection to the surface. Also, oil in water emulsions containing cationic emulsifiers uniformly exhaust onto the surfaces being treated as opposed to nonuniform deposition, which usually occurs when the emulsifier is ionic or nonionic. Most importantly, the use of a cationic emulsifier in an oil and water emulsion cause the oil hydrophobe to be electrostatically attracted toward most surfaces which does not occur when anionic and nonionic emulsions are used. Because the cationic emulsifier results in electrostatic attraction of the oil to the surface, uniform coatings of the oil are obtained from a smaller volume of emulsion per unit area than when nonionic or anionic emulsifiers are employed. Generally, the most desirable cationic emulsifiers are quaternary ammonium compounds, for example, monofatty trimethyl and difatty dimethyl quaternary ammonium chlorides and sulfates, quaternized imidazolines and quaternized ethoxylated amines.

Heretofore, it has not been possible to stabilize most oil and water emulsions with an emulsifier system which was composed entirely of quaternary cationic emulsifiers. In particular, it has not been possible to provide a totally cationic quaternary emulsifier system suitable for stabilizing an oil and water emulsion for use as an auto rinse aid wherein the oil has an HLB of about 10.0 or lower. In this connection, it has been necessary to mix the various cationic emulsifiers which have been used to stabilize mineral oil aqueous emulsions with nonionic emulsifiers, for example, ethoxylated alkylphenols and ethoxylated higher aliphatic alcohols, or with other cationic materials, such as ethoxylated amines, in order to provide an emulsifier system which could stabilize the oil and water emulsions.

It is highly desirable that the emulsifier system used to stabilize the oil and water emulsions be a totally cationic quaternary system, that is, that the sole emulsifiers present are cationic quaternaries, and that the emulsion be essentially free of nonquaternary cationic emulsifiers, nonionic emulsifiers and anionic emulsifiers. It is also desirable that the emulsifier system be essentially free of compounds which are subject to chemical and/or biological degradation in aqueous systems, for example, imidazolines.

Many oil in water emulsions, for example, those used as auto rinse aids, mat and mop treatment oils and solvent emulsion cleaners utilize a paraffinic or naphthenic mineral oil as the hydrophobic material. Generally, the paraffinic mineral oil will have a viscosity between about 20 and about 250 SSU at 100° F. Examples of such oils are those sold as mineral seal oils for example, products sold under the trade names Amoco Mineral Seal Oil and Humble No. 3200 Oil.

As indicated, a particularly useful oil in water emulsion is an auto rinse aid, sometimes referred to as auto spray wax, which is an emulsion of about 55 to 65 percent water, 20 to 30 percent oil, and 15 to 25 percent emulsifier. Preparation of auto rinse aids of this general formulation and their use to provide beading, and fast drying in auto washing is known and disclosed in Pats. Nos. 3,222,213 and 3,497,365. However, the emulsifiers disclosed in Pat No. 3,222,213 are preferably mixtures of imidazolines and ethoxylated amines. For the reasons set forth above, such mixtures of emulsifiers are not as useful in water in oil emulsions as might be desired.

It is an object of the present invention to provide an emulsifier system suitable for producing stable oil and water emulsions. Another object is to provide a totally cationic emulsifier system for producing stable oil and water emulsions over an HLB range of between about 8.0 and about 12.0. A further object is to provide an emulsifier system which includes difatty ethoxylated quaternized amidoamines containing particular blends of fatty acid residues which is suitable for use as the sole emulsifier in producing stable oil and water emulsions. Yet another object is to provide a method of exhausting an oil in water emulsion on the surface of an article to be treated which includes producing a stable oil in water emulsion with a mixture of difatty ethoxylated quaternized amidoamines and applying the emulsion to the surface of the article to be treated.

These and other objects of the invention will become apparent from the following detailed description.

Generally, the present invention is directed to an emulsifier system suitable for forming a stable oil and water emulsion which consists essentially of a cationic quaternary emulsifier selected from (a) a mixture of between about 10 percent and about 90 percent by weight of a difatty ethoxylated quaternized amidoamine of the formula

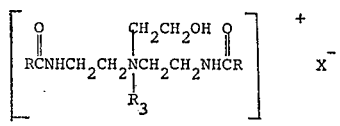

and between about 90 percent and about 10 percent by weight of a difatty ethoxylated quaternized amidoamine of the formula

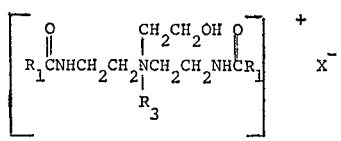

(b) a long chain difatty ethoxylated quaternized amidoamine quaternary of the formula

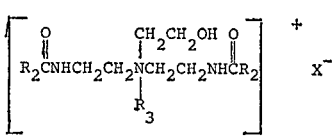

and mixtures of (b) with one or both of the quaternized amidoamines of (a), where R is a fatty acid residue derived from soya oil, and $R_1$ is a fatty acid residue derived from coconut oil, $R_2$ is a blend of fatty acid residues derived from a mixture of soya oil and coconut oil, $R_3$ is hydrogen, methyl, hydroxyethyl, or hydroxy propyl and X is a water soluble anion, for example, chloride or sulfate ($SO_4$). Generally, it is desirable to dissolve the emulsifier in a suitable solvent, for example, water, alkanols, glycols.

The present invention is also directed to a method of exhausting a hydrophobic material selected from mineral oil, polyethylene wax, various fluid silicones, ester waxes, hydrocarbon waxes, chlorinated hydrocarbons and the like having an HLB between 8 and 12 on the surface of an article which includes dispersing the hydrophobic material in an aqueous medium containing between about 0.001 percent of an emulsifier system as described above, and treating the article with the oil in water emulsion. The emulsion may contain between about 1 and about 35 percent by weight of the hydrophobic material.

It is well known that to provide a stable oil and water emulsion, the emulsifier or blend of emulsifiers must be tailored to fit the ingredients in the system. One measure of the necessary requirements of the emulsifier system is its HLB (hydrophobic-lipophilic balance). The HLB of the emulsifier must closely approximate the HLB of the ingredients in the system. The HLB system of classifying emulsifiers was developed in order to categorize nonionic emulsifiers, e.g., Spans and Tweens, but can, on an empirical basis, be used to categorize cationic emulsifiers. Calculation of HLB of various cationic emulsifiers is within the skill of the art.

In addition to HLB, the chemical structure of the emulsifier is important, and emulsifiers having the same HLB may not provide equal emulsification, depending upon the ingredients in the system. An oil in water emulsion of mineral oil typically has an HLB in the range between about 5 and about 15, most generally between 8 and 12. Over this HLB range the chemical composition of the emulsifier system is critical to obtain a desired stable fluid emulsion, and to obtain good exhaustion of the oil onto surfaces. Difatty dimethyl ammonium chloride quaternaries have a desired quaternary chemical configuration but do not provide stable emulsions of most mineral oil unless admixed with co-emulsifiers such as ethoxylated amines or nonionics. As indicated the presence of non-ionics impedes exhaustion of the oil on surfaces and is generally undesirable.

Imidazolines are undesirable for the reason they hydrolyze at high and low pH thus altering the HLB of the emulsifier. Imidazolines also require adjustment of the HLB by admixture with nonionic or other emulsifiers to within the desired range of 8 to 12 when it is desired to stabilize mineral oil emulsions.

The disclosed emulsifier system is a difatty ethoxylated quaternized diethylene triamine having a particular blend of fatty acid residues. The HLB of difatty ethoxylated diethylene triamine quaternaries containing a mixture of soya fatty acid residues and coconut fatty acid residues can be tailored to exactly match the HLB of an oil in water emulsion it is desired to stabilize. Further the chemical structure of such emulsifiers is particularly suited for emulsifying oil in water emulsions of mineral oil over an HLB range of between about 8 and about 12. In addition, and of particular importance where the oil in water emulsion is to be utilized to exhaust the oil on a metal surface, the emulsifier system described herein consists only of cationic quaternaries and the desired HLB of the system is attained in the absence of other emulsifiers.

The difatty ethoxylated diethylene triamine quaternaries containing blends of soya and coconut oil fatty acid residues may be prepared in two ways. The soya fatty acids quaternary and the coconut oil fatty acid quaternary may be separately prepared and the two quaternaries blended together in a desired ratio to provide the required HLB. When the emulsifier system is prepared in this fashion, between about 10 and 90 percent by weight of disoya ethoxylated diethylene triamine quaternary may be admixed with between about 90 and about 10 percent by weight of dicoco ethoxylated diethylene triamine to provide an emulsifier system having an HLB between about 12 and about 8. A 50:50 mixture of the disoya and the dicoco amidoamine quaternaries provides an HLB of about 10. Increasing the disoya quaternary content decreases the HLB while increasing the dicoco quaternary content increases the HLB. Preparation of a blend of disoya and dicoco quaternaries of a desired HLB may be readily accomplished.

It is also contemplated, and it is generally preferable, to prepare the difatty amidoamine quaternary from a blend of soya oil and coconut oil in order to provide an emulsifier system which is a reaction mixture containing quaternaries in which both of the fatty acid radicals are soya residues, quaternaries in which both of the fatty acid radicals are coconut residues, and quaternaries in which one of the fatty acid radicals is a soya residue and the other is a coconut residue. The exact structure and proportions of the reaction mixture is quite complex due to the number of different chain length fatty acids in soya and coconut oil, and the composition of the emulsifier system cannot be stated with accuracy. However, and regardless of the composition, the HLB of the resulting emulsifier system may be conveniently varied between about 8 and about 12 by varying the ratio of soya oil to coconut oil used in the manufacture of quaternary within about 9:1 and about 1:9. When the ratio of soya oil to coconut oil is about 9:1, the resulting quaternary will have an HLB of about 8. When the ratio of soya oil to coconut oil is about 1:9, the resulting quaternary will have an HLB of about 12. Various HLBs, within those set forth above, may be readily prepared by those skilled in the art by varying the ratios of soya oil to coconut oil within the indicated ranges. Ratios of soya oil to coconut oil between about 6:4 and 4:6 will provide an emulsifier having a particularly desirable HLB of between about 9.5 and about 10.7. Notwithstanding the fact that the exact composition of the reaction mixture of difatty ethoxylated amidoamine quaternaries prepared from a mixture of soybean oil and coconut oil is unknown, the results that are obtained are reproducible and consistent results, with consistent HLB's may be readily obtained.

The reaction mixture emulsifier systems prepared from blends of soya and coconut fatty acid residues are particularly advantageous because they provide desired HLB ranges suitable for stabilizing mineral oil in water emulsions. It was unexpected that blends of readily available soya and coconut oils would be capable of providing the desired HLB ranges when used in the manufacture of difatty ethoxylated amidoamine quaternaries. In this connection, soya oil is a vegetable oil derived from soybeans and generally contains a predominance of unsaturated fatty acid residues, principally oleic and linoleic, having 18 carbon atoms. Coconut oil is obtained from coconuts and has a principal fatty acid residue of lauric acid. Of course, it would be possible to substitute fatty acids which are mixtures, or even single fatty acids derived by molecular distillation or splitting of the oils into fatty acids followed by molecular separation or distillation, but because of the convenience and low cost involved in utilizing commercially available mixtures of oils, it is generally preferred to employ soya oil and coconut oil. On the other hand, in some instances, it might be desirable to substitute tallow or other fat for the soya oil, and it may also be desirable to substitute palm kernel oil or another lauric oil for the coconut oil. Substitution of oils, and adjustment of the HLB by varying ratios of these oils is considered to be within the skill of the art. However, it is generally preferred to use mixtures of soya oil and coconut oil.

The difatty ethyoxylated amidoamine quaternary preferably contains a single hydroxyethyl group in order to provide HLB's within the desired range. However, as with the substitution of other oils for soya oil and coconut oil, it is contemplated that in some instances it might be desirable to add additional moles of ethylene oxide recognizing, of course, that this changes the HLB. The amount of ethylene oxide should, however, not exceed about 10 moles per mole of quaternized amidoamine in order to provide emulsifier systems having a desired HLB. It is also possible, and within the skill of the art to substitute propylene oxide for ethylene oxide, or mixtures of ethylene oxide and propylene oxide may be used.

The difatty ethoxylated amidoamine may be quaternized with various of the well known quaternizing agents, for example, methyl chloride, dimethyl sulfate. Again, it must be borne in mind what effects the use of different quaternizing agents has on the HLB of the emulsifier system. It has been found that particularly desirable results are obtained when the quaternization is effected through the use of methyl chloride. This provides a methyl group on the middle nitrogen atom in the quaternary, and does have an effect upon the HLB of the emulsifier system. When the quaternary is prepared by other means, for example, salt formation with hydrochloric acid followed by ethoxylation to complete quaternization, the substituent on the middle nitrogen may be hydroxyethyl, and variations in the ratios of soya oil and coconut oil may be desirable in order to provide the required HLB.

The manufacture of the difatty ethoxylated amidoamine emulsifiers is well known and does not form a part of this invention. In this connection, the described emulsifiers may be prepared by reacting the soya and/or coconut oil with diethylene triamine at temperatures within the range of 220° F. to 300° F. in order to effect glycerolysis of the triglyceride oil and form the difatty amidoamine with the liberation of glycerol. The difatty amidoamine is then solubilized in a suitable solvent, such as isopropanol, and cooled to 180° F. to 200° F. where it is reacted with ethylene oxide. Generally, the ethoxylation reation is exothermic and water cooling is required to maintain the desired temperature. The ethoxylated difatty amidoamine may be immediately quaternized by the addition of methyl chloride over a period of about 4 to 12 hours at 50 p.s.i.g. and at a temperature of 180° F. to 200° F. The quaternization reaction is essentially complete when the free amine content is less than about 5 percent based upon the molecular weight of the ethoxylated amidoamine. The material may then be cooled to 120° F. and solids content adjusted by the addition of isopropanol. Generally, the quaternary product will have a Gardner color between about 8 and about 12, and will be a clear or slightly hazy liquid.

Another advantage of the described cationic quaternary emulsifier system is that minor variations in the desired HLB may be provided by admixing minor amounts of the disoya amidoamine or the dicoco amidoamine with the emulsifier reaction product prepared from mixtures of soya and coconut oil. The adjustment of the HLB in this manner is advantageous because the chemical structure of the emulsifier system remains the same and the addition of dissimilar cationic materials or the addition of nonionics is not necessary. Blends of reaction product emulsifiers prepared from different ratios of soya to coconut oils may also be prepared in order to provide a means whereby blending of the various emulsifiers together in specified amounts can provide an HLB of substantially any value between about 8 and about 12.

As previously indicated, the difatty amidoamine emulsifier system is particularly desirable for stabilizing oil in water emulsions having an HLB between about 8 and about 12.

EXAMPLE I

A dicoco ethoxylated amidoamine was prepared by charging 1800 pounds (2.75 moles) of refined coconut oil and 430 pounds (4.17 moles) of diethylene triamine into a 500 gallon glass lined pressure reactor equipped with a stirrer and an external jacket for heating and cooling. The charge was heated to 280° F. and held under agitation for four hours. The reaction was essentially complete at this time as shown by titration for unreacted amine with hydrochloric acid. The difatty diethylene amide condensate was cooled to 160° F. and 400 pounds of isopropanol was added to the reactor to dissolve the condensate. This mixture was then heated to 180° F. and 280 pounds of ethylene oxide (1.5 moles per mole of amidoamine) was pumped into the mixture over a period of three hours at a temperature between 180° F. and 200° F. The maximum pressure developed during the addition of the ethylene oxide was 40 p.s.i.g., and water cooling of the reaction vessel was required to maintain the temperature below 200° F. Immediately after addition of the last amount of ethylene oxide, methyl chloride was introduced into the reactor over a period of about 12 hours at 50 p.s.i.g. and at a temperature of 180° F. to 200° F. The quaternization reaction was essentially complete when the free amine content dropped to below about 5 percent, based upon the molecular weight of the ethoxylated amidoamine. The batch was then cooled to 120° F. and the solids content was adjusted to 75 percent by addition of 210 pounds of isopropanol. The dicoco ethoxylated amidoamine quaternary product was a viscous, slightly hazy liquid with a Gardner color of 11.

EXAMPLE II

A disoya ethoxylated amidoamine quaternary was prepared in accordance with Example I from 1800 pounds (2.02 moles) of soybean oil and 320 pounds (3.1 moles) of diethylene triamine. The amidoamine product was diluted with 400 pounds of isopropanol and subsequently reacted with 220 pounds of ethylene oxide at 180° F. to 200° F. The ethoxylated product was then quaternized with methyl chloride and 180 pounds of isopropanol was added to adjust the solids content to 75 percent. The product was a clear liquid having a Gardner color of about 10.

EXAMPLE III

A reaction product emulsifier system was prepared in accordance with Example I by charging to the reactor 950 pounds (1.05 moles) of soybean oil, 850 pounds (1.30 moles) of coconut oil, and 375 pounds (3.63 moles) of diethylene triamine. The amidoamine reaction product was obtained by reacting the charged ingredients at 280° F. for 4 hours and was then cooled to 160° F. and diluted with 400 pounds of isopropanol solvent. 250 pounds of ethylene oxide was then pumped into the reactor over a period of 3 hours at 180° F. to 200° F. The product was then quaternized with methyl chloride to less than 5 percent free amine, cooled and solids were adjusted to 75 percent with 190 pounds of isopropanol. The product was a clear fluid liquid with a Gardner color of about 11.

EXAMPLE IV

Blends of the emulsifiers of Examples I and II were prepared in the following ranges and the emulsifiers were found to have an HLB as indicated.

| Example I | Example II | HLB |
| --- | --- | --- |
| 100% | 0% | 7.5 |
| 80% | 20% | 8.9 |
| 60% | 40% | 9.8 |
| 55% | 45% | 1000 |
| 50% | 50% | 10.1 |
| 40% | 60% | 10.7 |
| 20% | 80% | 11.6 |
| 0% | 100% | 12.5 |

The various emulsifier systems were utilized as an emulsifier in an oil and water system containing 16 percent emulsifier, 20 percent of paraffinic oil having a viscosity of 41 SSU at 100° F., 3 percent ethylene glycol monobutyl ether as a coupling aid and 61 percent water. The 55 percent disoya-45 percent dicoco emulsifier system produced a clear fluid stable oil in water emulsion, the other emulsifier systems provided insoluble, thick or separated systems.

The reaction product emulsifier of Example III was utilized in a similar oil in water emulsion and also produced a clear fluid stable emulsion.

EXAMPLE V

Rinse aids for auto laundries and car washes were prepared having the following compositions:

| | Percent | | |
| --- | --- | --- | --- |
| | A | B | C |
| Emulsifier system of Example III | 20 | 18 | 16 |
| Polysorbate 80 | | 2 | |
| Paraffinic mineral oil, 41 SSU at 100° F | 25 | 25 | 20 |
| Butyl Cellosolve | | | 3 |
| Water | 55 | 55 | 61 |

One part of each of the above formulations may be diluted with 5 to 10 parts of water and used at a level of between about 1 ounce and 10 ounces per car in rinsing automobiles. It was found that each of these formulations provided a good film on the surface of the automobile upon which water immediately beaded up. It was possible to substantially air dry the car and the labor associated with removing the water from the car was greatly reduced.

EXAMPLE VI 30 percent by weight of the emulsifier of Example I was blended with 70 percent by weight of the emulsifier of Example II to provide an emulsifier blend having an HLB of 11.1. An oil and water emulsion was prepared containing 20 percent by weight of paraffinic mineral oil sold under the tradename Bay Oil 2905 having a viscosity of 34 SSU at 100° F., 16 percent by weight of the emulsifier blend 3 percent by weight ethyleneglycol monobutylether coupling agent, and 61 percent by weight water. The oil and water emulsion obtained was a clear fluid. One part of this emulsion was diluted with 10 parts of water and 6 ounces of the diluted emulsion was applied in a stream of 5 gallons of water in the cleaning of an automobile in a car wash. The mineral oil uniformly exhausted from the emulsion and coated the car with a thin oil film which caused water to bead on the automobile surface. An air blast directed aagainst the automobile easily blew the beaded water from the automobile surface so that the automobile was essentially dry.

When other ratios of the emulsifiers of Examples I and II were blended together and mixed with Bay Oil 2905 mineral oil in an identical oil and water emulsion, the emulsion was cloudy or unstable and was considered unsatisfactory.

EXAMPLE VII

A reaction product emulsifier system was prepared in accordance with Example III from a blend of 90 percent coconut oil and 10 percent soya oil raw materials. The resulting reaction product emulsifier had an HLB of 8.2. An oil and water emulsion was prepared in accordance with Example VI using this emulsifier to stabilize a mixture of paraffinic mineral oils sold under the tradename Semtol 85-25, having a viscosity of 85 SSU at 100° F. One part of the oil and water emulsion was diluted with 10 parts of water and 6 ounces of the diluted emulsion was applied in a stream of 5 gallons of water to clean automobiles in a car wash in accordance with Example VI.

Good beading of the water on the surface of the automobile was obtained. Use of emulsifiers prepared from different ratios of soya and coconut oil raw materials in the manufacture of the reaction product emulsifier caused cloudy or unstable oil and water emulsions which were considered unsatisfactory.

EXAMPLE VIII

In a further example of the use of a reaction product emulsifier for use in car washing applications, an emulsifier was prepared in accordance with Example III from a 50:50 mixture of coconut oil and soya oil raw materials. The resulting emulsifier had an HLB of 10.1. This emulsifier was used in the preparation of an oil and water emulsion containing 15 percent by weight emulsifier, 25 percent by weight of an 80 percent paraffinic-20 percent aromatic mineral oil sold under the trade name Napoleum 600 mineral seal oil having a viscosity of 40 SSU at 100° F., 3 percent by weight isopropanol and 57 percent by weight water. When utilized in a car wash in accordance with Example VI excellent results were obtained and the water beaded up on the surface of the cars so that it could be readily removed by air blowing.

EXAMPLE IX

A blend of 20 percent by weight of the emulsifier of Example I and 80 percent by weight of the emulsifier of Example II was prepared. This emulsifier had an HLB of 11.6. An emulsion containing 2.5 percent by weight of the emulsifier blend, 22.5 percent by weight of emulsifiable polyethylene sold under the trade name Epolene E-10, and 75 percent by weight water. The resulting polyethylene and water emulsion was stable upon storage without separation. The emulsion was added to a conventional washing machine in which synthetic fabrics were washed. Examination of the fabric after washing indicated that the polyethylene was exhausted onto the fabric with uniformity and imparted lubricating and softening properties thereto. Other ratios of the emulsifiers of Examples I and II, when utilized to form an oil and water emulsion of Epolene E-10, were unstable and the polyethylene rapidly separated from the water phase.

EXAMPLE X

A reaction product emulsifier was prepared in accordance with Example III from a raw material containing 80 percent by weight coconut oil and 20 percent by weight soya oil. The resulting reaction product emulsifier had an HLB of 8.9. An oil and water emulsion containing 0.5 part by weight of the reaction product emulsifier, 10 parts by weight of a paraffinic mineral oil having a viscosity of 85 SSU at 100° F. and 700 parts by weight of water was prepared. The emulsion was a cloudy stable emulsion to which red dye was added. 25 grams of cotton mop fabric was then added to the emulsion and the emulsion was agitated. After 10 minutes the water phase was clear and the mop fabric was uniformly dyed red indicating that all of the oil phase had exhausted from the emulsion onto the fabric. The mop material was then dried and used for dusting floors. The presence of the oil on the mop fibers caused the mop to retain a greater degree of dust than a similar untreated mop. When similar mop and mat oil emulsions were prepared in which the ratio of coconut oil to soya oil was varied, the emulsions were less stable and the exhaustion of the oil onto the fabric was uneven as exemplified by uneven dyeing of the fabric.

It will be seen that an emulsifier system has been described which is particularly desirable in stabilizing oil and water emulsions. More particularly, a totally cationic quaternary emulsifier system had been disclosed which, through the use of blends of emulsifiers and/or blends of fatty acid containing raw material, may be closely matched to the hydrophobe material which is desired to be suspended. The emulsifier systems may be readily prepared using conventional equipment and low cost raw materials.

Although certain features have been described with particularity in order to set forth the invention, various alternatives, within the ordinary skill of the art are contemplated.

Various of the features of the present invention are set forth in the following claims.

What is claimed is:

1. An emulsifier system suitable for use in forming a stable water and oil emulsion consisting essentially of a cationic emulsifier selected from:

(a) a mixture of between about 10 percent and about 90 percent by weight of a long chain difatty ethoxylated quaternized amidoamine of the formula

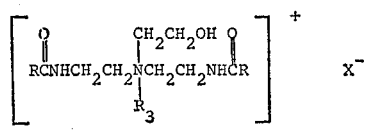

and between about 90 and about 10 percent by weight of a long chain difatty ethoxylated quaternized amidoamine of the formula

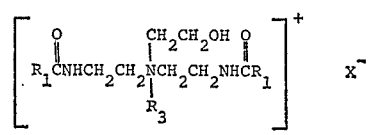

(b) a long chain difatty ethoxylated quaternized amidoamine of the formula

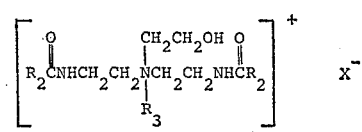

and mixtures of (b) with one or more of the amidoamines of (a);

where R is a fatty acid residue derived from soya oil, $R_1$ is a fatty acid residue derived from coconut oil, $R_2$ is a mixture of fatty acid residues derived from a blend of soya oil and coconut oil in a weight ratio of between about 9:1 and 1:9, $R_3$ is hydrogen, methyl hydroxyethyl or hydroxypropyl, and X is chloride or sulfate, said emulsifier system having an HLB between about 8 and about 12.

2. An emulsifier system in accordance with claim 1 consisting essentially of a long chain difatty ethoxylated quaternized amidoamine reaction product of the formula

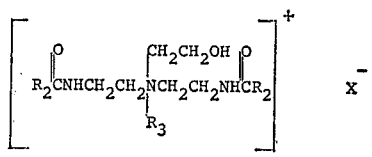

where $R_2$ is a mixture of fatty acid residues derived from a mixture of soya oil and coconut oil in a weight ratio of between about 9:1 and 1:9, $R_3$ is hydrogen, methyl, hydroxyethyl or hydroxypropyl and X is chloride or sulfate.

3. An emulsifier system in accordance with claim 2 wherein $R_2$ is derived from a mixture of soya oil and coconut oil in a weight ratio of between about 6:4 and about 4:6.

4. An emulsifier system in accordance with claim 1 consisting essentially of between about 10 and about 90 percent by weight of long chain difatty ethoxylated quaternized amidoamines of the formula

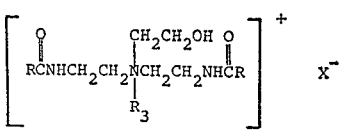

and between about 90 and about 10 percent by weight of a long chain difatty ethoxylated quarternized amidoamine of the formula

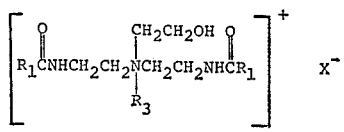

where R is a fatty acid residue derived from soya oil, $R_1$ is a fatty acid residue derived from coconut oil, $R_3$ is hydrogen, methyl, hydroxyethyl or hydroxypropyl, and X is chloride or sulfate.

5. An emulsifier system in accordance with claim 1 consisting essentially of a long chain difatty ethoxylated quaternized amidoamine of the formula

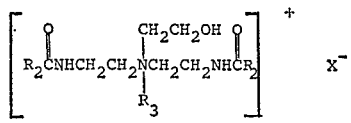

and at least one long chain difatty ethoxylated quaternized amidoamine selected from

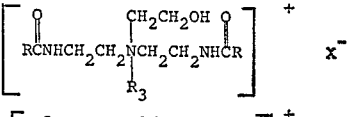

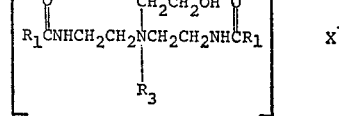

where R is a fatty acid residue derived from soya oil, $R_1$ is a fatty acid residue derived from coconut oil, $R_2$ is a mixture of fatty acid residues derived from a blend of soya oil and coconut oil in a weight ratio of between about 9:1 to 1:9, $R_3$ is hydrogen, methyl, hydroxyethyl or hydroxypropyl, and X is chloride or sulfate, said emulsifier system having an HLB between about 8 and about 12.

References Cited
UNITED STATES PATENTS 2,901,430   8/1959   Chiddix et al. _____ 252—357 X RICHARD D. LOVERING, Primary Examiner U.S. Cl. X.R.

8—85; 106—11; 252—8.8, 153, 309, 312, 358, DIG. 3

UNITED STATES PATENT OFFICE
CERTIFICATE OF CORRECTION

Patent No. 3,658,718  Dated  April 25, 1972

Inventor(s) Jon Michael Clumpner

It is certified that error appears in the above-identified patent and that said Letters Patent are hereby corrected as shown below:

Column 3, line 46, after "percent" insert --and about 50 percent--

Column 7, line 19, in the table under HLB "1000" should be --10.0--

Signed and sealed this 5th day of September 1972.

(SEAL)
Attest:

EDWARD M. FLETCHER, JR.  ROBERT GOTTSCHALK
Attesting Officer  Commissioner of Patents